(12) United States Patent
Spickard et al.

(10) Patent No.: US 7,926,512 B2
(45) Date of Patent: *Apr. 19, 2011

(54) STEPPER MOTOR DRIVEN PROPORTIONAL FUEL METERING VALVE

(75) Inventors: Mark A. Spickard, Rockford, IL (US); Brian E. Hoemke, Belvidere, IL (US)

(73) Assignee: Woodward, Inc., Fort Collins, CO (US)

( * ) Notice: Subject to any disclaimer, the term of this patent is extended or adjusted under 35 U.S.C. 154(b) by 494 days.

This patent is subject to a terminal disclaimer.

(21) Appl. No.: 12/040,512

(22) Filed: Feb. 29, 2008

(65) Prior Publication Data

US 2008/0142100 A1 Jun. 19, 2008

Related U.S. Application Data

(63) Continuation-in-part of application No. 11/094,099, filed on Mar. 30, 2005, now Pat. No. 7,337,806.

(51) Int. Cl.
*F15B 13/043* (2006.01)
(52) U.S. Cl. ............... 137/625.64; 137/625.66
(58) Field of Classification Search ............ 137/625.64, 137/625.66; 239/225.1, 541, 583
See application file for complete search history.

(56) References Cited

U.S. PATENT DOCUMENTS

| | | | |
|---|---|---|---|
| 3,405,727 A | 10/1968 | Hill | |
| 3,406,701 A | 10/1968 | Meulendyk | |
| 4,090,589 A | 5/1978 | Fitzwater | |
| 4,136,655 A | 1/1979 | Mannhardt | |
| 4,664,084 A | 5/1987 | Wheelock | |
| 4,672,992 A | 6/1987 | Vanderlaan et al. | |
| 4,793,377 A | 12/1988 | Haynes et al. | |
| 5,094,260 A | 3/1992 | Stuart et al. | |
| 6,214,300 B1 | 4/2001 | Morrison et al. | |
| 6,776,393 B2 | 8/2004 | Burgos | |
| 2003/0226995 A1 | 12/2003 | Burgos | |
| 2006/0218928 A1 | 10/2006 | Spickard et al. | |

*Primary Examiner* — John Rivell
*Assistant Examiner* — Craig M Schneider
(74) *Attorney, Agent, or Firm* — Reinhart Boerner Van Deuren P.C.

(57) ABSTRACT

A low energy stepper motor driven fuel metering valve (FMV) that eliminates the need for a position sensor is provided. The stepper motor rotates a cam that replaces the flapper valve used in conventional systems. The cam rotation increases the gap between the cam and nozzle on one side of the cam. The gap difference affects the pressures on the spool piston ends, which forces the piston in the direction that will return the cam-nozzle gap to a distance that results in a pressure balance to return. As a result, the relatively low energy stepper motor controls the relatively high energy hydromechanical system via the cam-nozzle-orifice system. The cam is precision machined and assures stroke/degree gain accuracy. The hydraulic system assures the piston tracks the cam essentially perfectly except for the effects of piston stiction forces.

20 Claims, 9 Drawing Sheets

STEPPER MOTOR DRIVEN PROPORTIONAL FUEL METERING VALVE

CROSS-REFERENCE TO RELATED PATENT APPLICATION

This patent application is a continuation-in-part of co-pending U.S. patent application Ser. No. 11/094,099, filed Mar. 30, 2005, the entire teachings and disclosure of which are incorporated herein by reference thereto.

FIELD OF THE INVENTION

This invention pertains to fuel metering valves, and more particularly to sensorless fuel metering valves.

BACKGROUND OF THE INVENTION

Conventional electro-hydraulic servo valve (EHSV) based fuel metering valve (FMV) systems employ a closed loop position control system. The first stage of the servo valve is typically a double or single acting flapper valve with a torque-motor actuated flapper and the second stage is a spool type fuel metering valve (FMV). These systems include a position sensor on the spool valve for position feedback and either an integrating controller or proportional controller used for control. The integrating controller assures that the steady state sensed position matches the commanded position. However, the actual position versus commanded position is still susceptible to inaccuracies of the position sensor gain and position (i.e., calibration of the position sensor to the valve position), the position sensor demodulator accuracy, channel-channel tracking and digital resolution. The proportional controller is susceptible to the above inaccuracies as well as an allowed steady state error that is a function of disturbance magnitudes and the proportional gain of the controller.

Regardless of the controller type, the accuracy of the closed loop FMV position system is very highly dependent on the position sensor accuracy. For precise metering applications such as in aircraft fuel systems, the position sensors need to be very accurate and have high resolution. While very accurate, the position sensors are typically very expensive, both in terms of time and cost. They are relatively difficult to interface with due to the mechanical interface, the hydraulic interface, the number of small gauge wires, complicated demodulation circuitry, etc. Position sensors are also prone to failure due to the reliability of small gauge wires. This failure mode leads to dual channel requirements (i.e., two separate position sensors, drivers, and motor control) and additional cost in order to meet reliability requirements.

Elimination of the FMV position feedback sensor will save money and weight. However, the lack of position feedback and the closed loop controller means that the effects of disturbances and/or the variations in forward path gain that are sensed and/or compensated in the closed loop controller will no longer be sensed and/or compensated. To negate these adverse effects, the magnitude of the disturbances should be minimized, the inherent disturbance rejection characteristics of the forward path should be maximized and the gain accuracy of the forward path should be made insensitive to the environment. In other words, the forward path must be "robust." The forward path must also be strictly proportional since there is no feedback to prevent the divergence that would occur with an integrating forward path.

Conventional EHSV based systems use a low energy torque motor that controls a high energy hydraulic system. The motor used has high speed but very low torque and thus low energy. The low torque levels result in the motor (and thus the FMV) being substantially affected by relatively small DC torque disturbances. For example, isolation seals, relaxation of torsion spring preload, magnet MMF (magnetomotive force) variations, variations in flux path reluctance, discrete steps in nozzle pressure feedback forces, thermal induced movement of parts, etc. can affect the torque motor. The torque motor also does not support good dynamic torque disturbance rejection (e.g., current transient, vibration, etc.) and creates resonance issues. Indirect position feedback techniques such as the use of springs degrade the FMV stiction (i.e., static friction) disturbance rejection. In addition, plugged first stage hydraulics (e.g., flapper-nozzle gap contamination) will lead to total divergence of the spool position to either shutoff or max flow. Additionally, the indirect feedback approach requires an excessive position error to produce any substantial crush force if contaminant gets in the nozzle-flapper gap.

What is needed is a system that overcomes the problems of the conventional EHSV based systems as discussed above. The invention provides such a system. These and other advantages of the invention, as well as additional inventive features, will be apparent from the description of the invention provided herein.

BRIEF SUMMARY OF THE INVENTION

The invention provides a stepper motor driven fuel metering valve that eliminates the need for a position sensor and position feedback. The stepper motor is used to drive a cam that, in a two nozzle embodiment, is designed such that the cross-cam distance on the nozzle-nozzle centerline of the fuel metering valve is a constant for any operational cam angle. Additionally, the tangent to the cam surface is perpendicular to the nozzle-nozzle centerline, thereby allowing the cam to contact and push on the nozzles if needed. Both single and double nozzle configurations are presented.

The stepper motor drives a gearbox connected to the cam. The stepper motor in combination with the gearbox provides the capability to decrease stepper motor speed and increase its torque while staying at the same energy level. This is accomplished by proper selection of the motor stator and rotor tooth count and the gearbox ratio.

Other aspects, objectives and advantages of the invention will become more apparent from the following detailed description when taken in conjunction with the accompanying drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

The invention provides a stepper motor driven fuel metering valve that eliminates the need for a position sensor and position feedback. The hydraulic amplification that is typically provided by an EHSV flapper valve is eliminated and replaced with a constant gain cam-nozzle amplification-tracking system. The combination of the cam-nozzle, stepper motor, and a gearbox provide an accurate and robust fuel metering valve positioning system.

Figure 1:
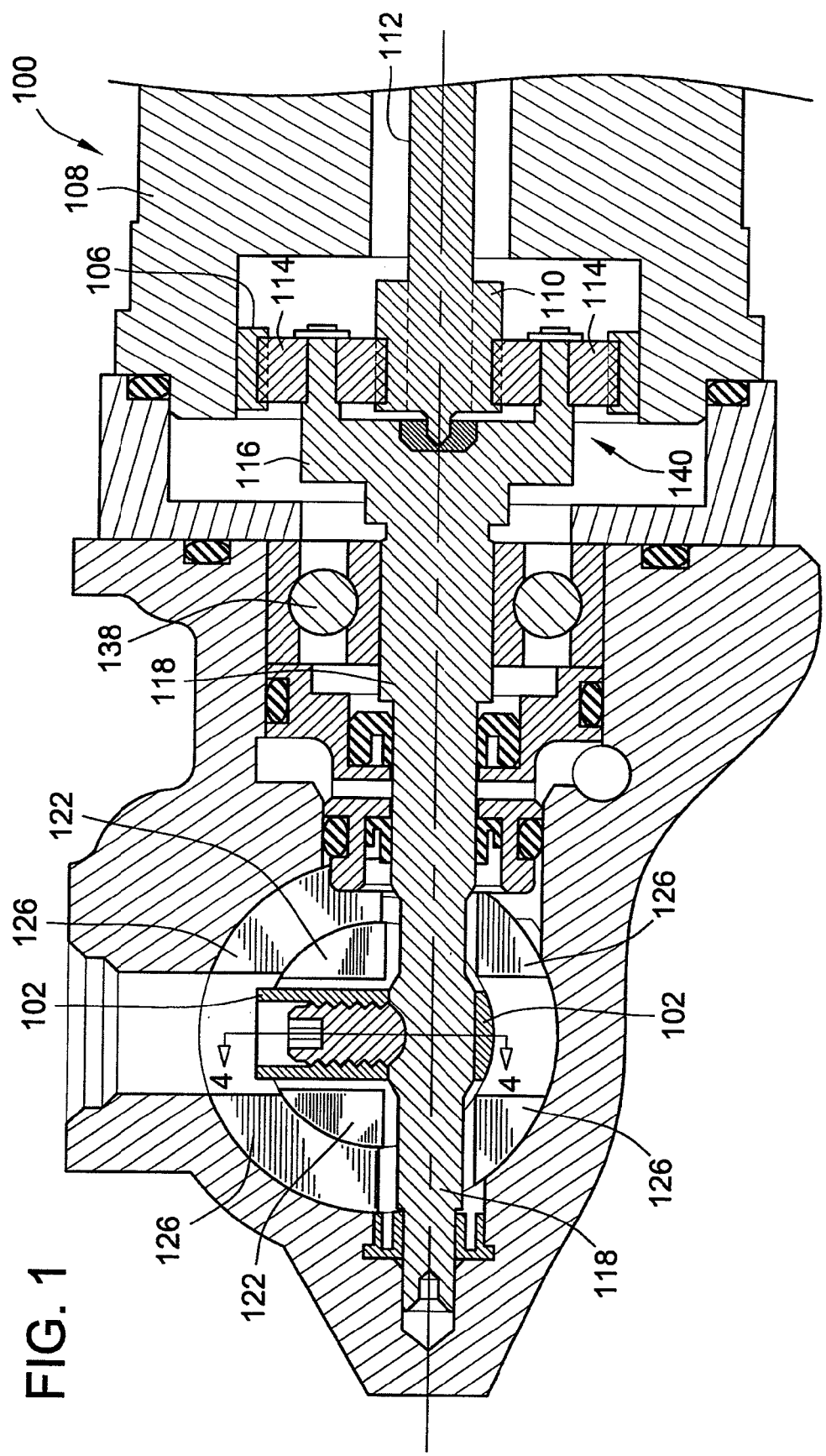
FIG. 1 is a cross-sectional view of the fuel metering valve system in accordance with the teachings of the present invention.
Figure 2:
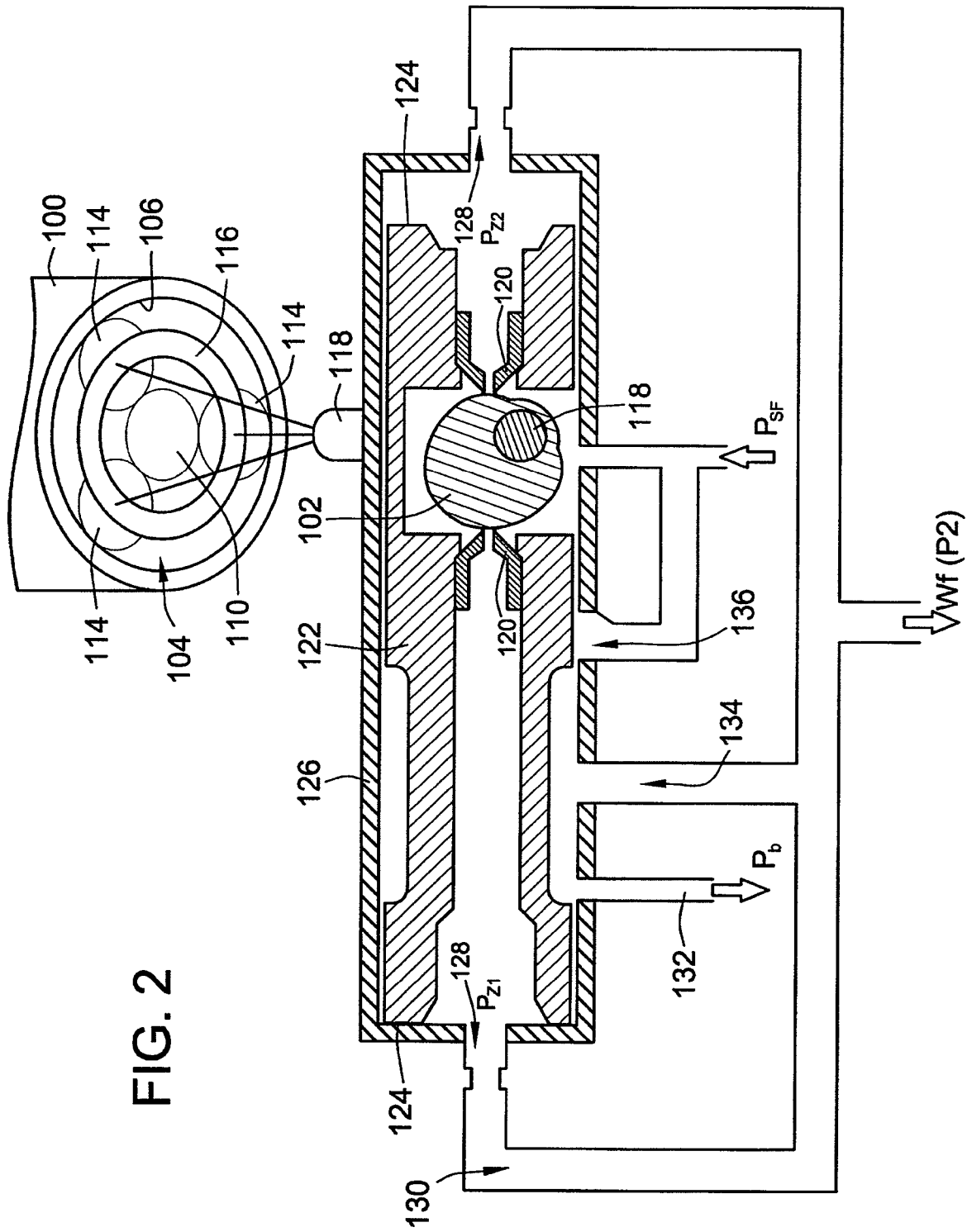
FIG. 2 is a cross-sectional view of the fuel metering valve of FIG. 1 with the stepper motor shown as a separate component for clarity and the valve piston at the maximum left position (i.e., the shutoff position)

Turning to the drawings, wherein like reference numerals refer to like elements, the invention provides a stepper motor driven robust proportional fuel metering valve. With reference to FIGs. 1 and 2, a stepper motor 100 is used to drive cam 102. The stepper motor drives a planetary gear system 104 where the ring gear 106 is integral to the stepper motor housing 108. The pinion gear 110 is integral to the stepper motor rotor 112. When the stepper motor 100 is stepped, the pinion gear 110 rotates. The planet gears 114 rotate about their respective axis as the pinion gear 110 rotates. The interface of the planet gears 114 to the stationary ring gear 106 causes the planet gears 114 to traverse along an arc as they rotate about their axis. Traversing of the planet gears 114 causes the planet frame 116, which is attached to the planet gears 114, to rotate. The output shaft 118 is attached to the planet frame 116 and rotates with it. Similarly, the cam 102 is attached to the output shaft 118 rotates with the output shaft 118.

In the two nozzle embodiment illustrated in FIG. 2, the cam rotation increases the gap between the cam 102 and nozzle 120 on one side of the cam 102 and decreases the gap between the cam 102 and nozzle 120 on the other side. The differences in the gaps affect the Pz1 and Pz2 pressures on the ends 124 of the piston 122 so as to force the piston 122 in the direction that will re-equalize the cam-nozzle gaps. As a result, the relatively low energy stepper motor thus controls the relatively high energy hydromechanical system via the dual cam-nozzle-orifice system in an amplifying-tracking manner.

In this embodiment, when the cam 102 is positioned such that the piston 122 is to the left-most position in the valve body 126, the first stage hydraulic flow will pass through the cam-nozzle-orifice system (i.e., around cam 102 and through nozzles 120 and orifices 128, enter the fuel metering discharge line 130, enter the fuel metering valve (FMV) through the P2 port 134 and then drain out the Pb port 132 due to the lower pressure in the Pb drain. Under this condition Psf−P2=Psf−Pb (where Psf is source pressure, P2 is the outlet pressure, and Pb is the drain pressure) and the valve spool 122 is at a closed position (i.e., shutoff position). It should be noted that the direction of flow is from the cam 102 into the nozzle 120 and out orifice 128 (i.e., "flow in") as compared to conventional EHSV valves where flow is from the orifice 128 out of the nozzle 120 (i.e., "flow out").

Figure 3:
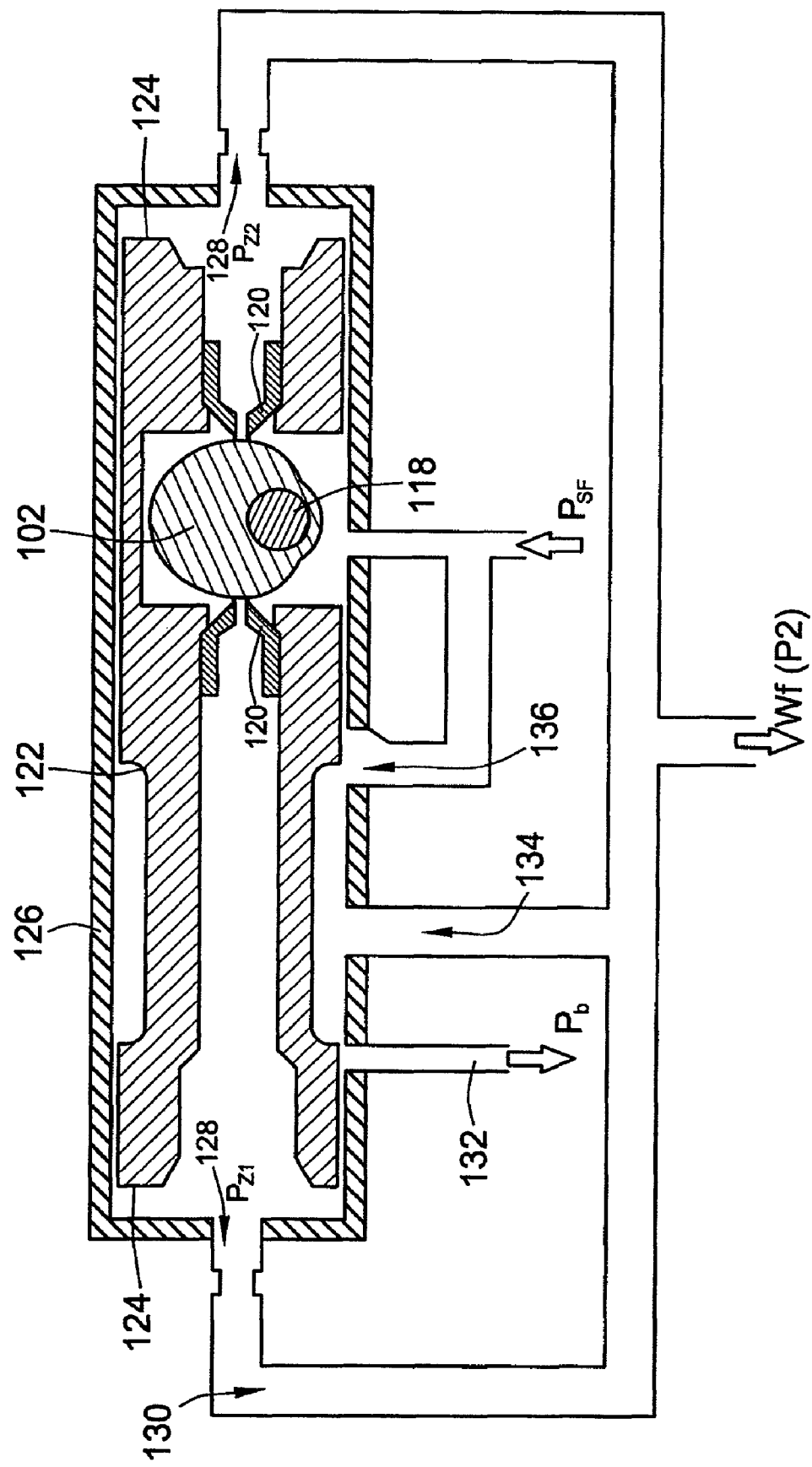
FIG. 3 is a cross-sectional view of the fuel metering valve of FIG. 2 with the piston at a centered position.
Figure 4:
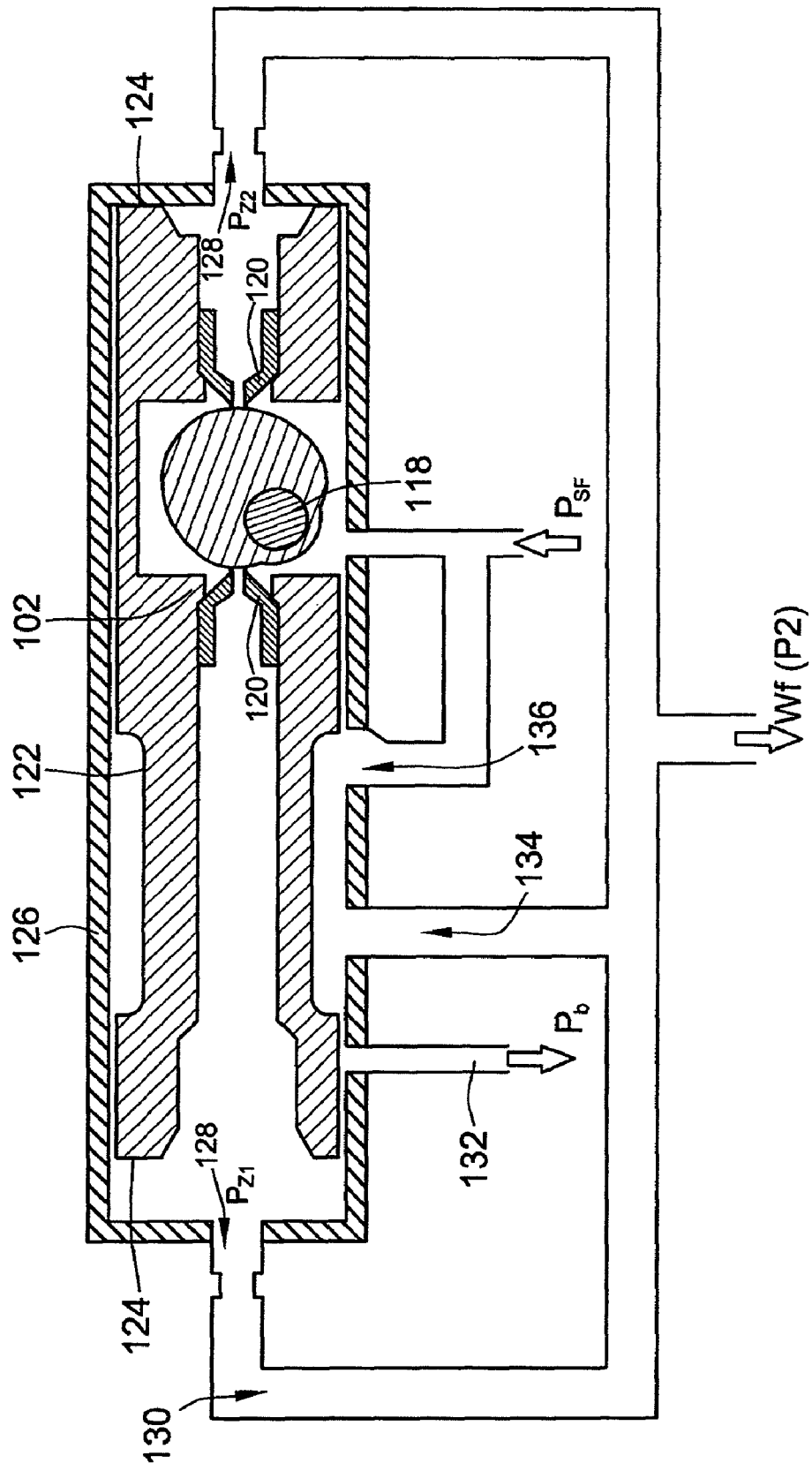
FIG. 4 is a cross-sectional view of the fuel metering valve of FIG. 2 with the piston at the maximum right position (i.e., the maximum flow position)
Figure 5:
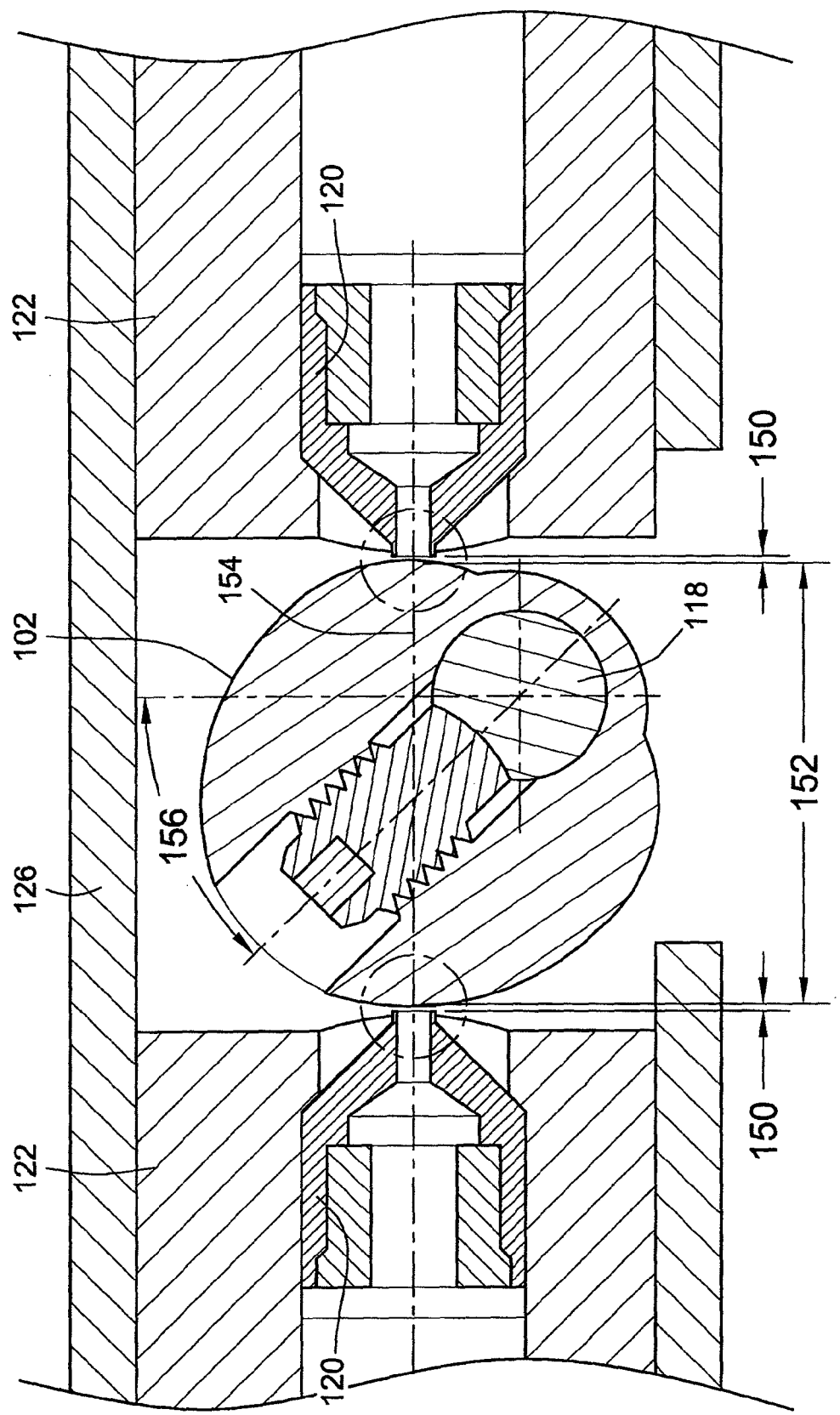
FIG. 5 is an enlarged cross-sectional view of the cam and nozzles of FIG. 3.
Figure 6:
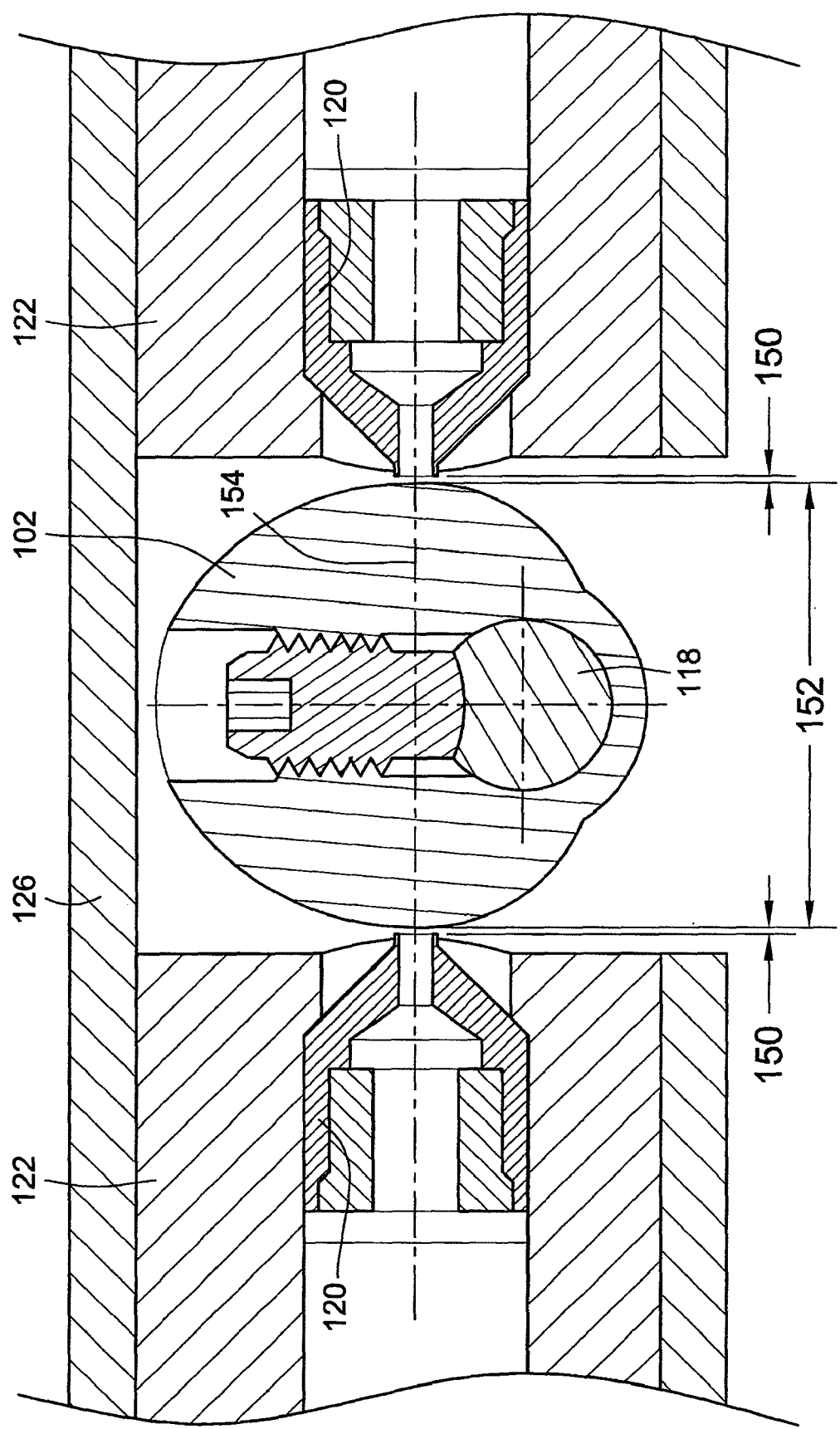
FIG. 6 is an enlarged cross-sectional view of the cam and nozzles of FIG. 4.
Figure 7:
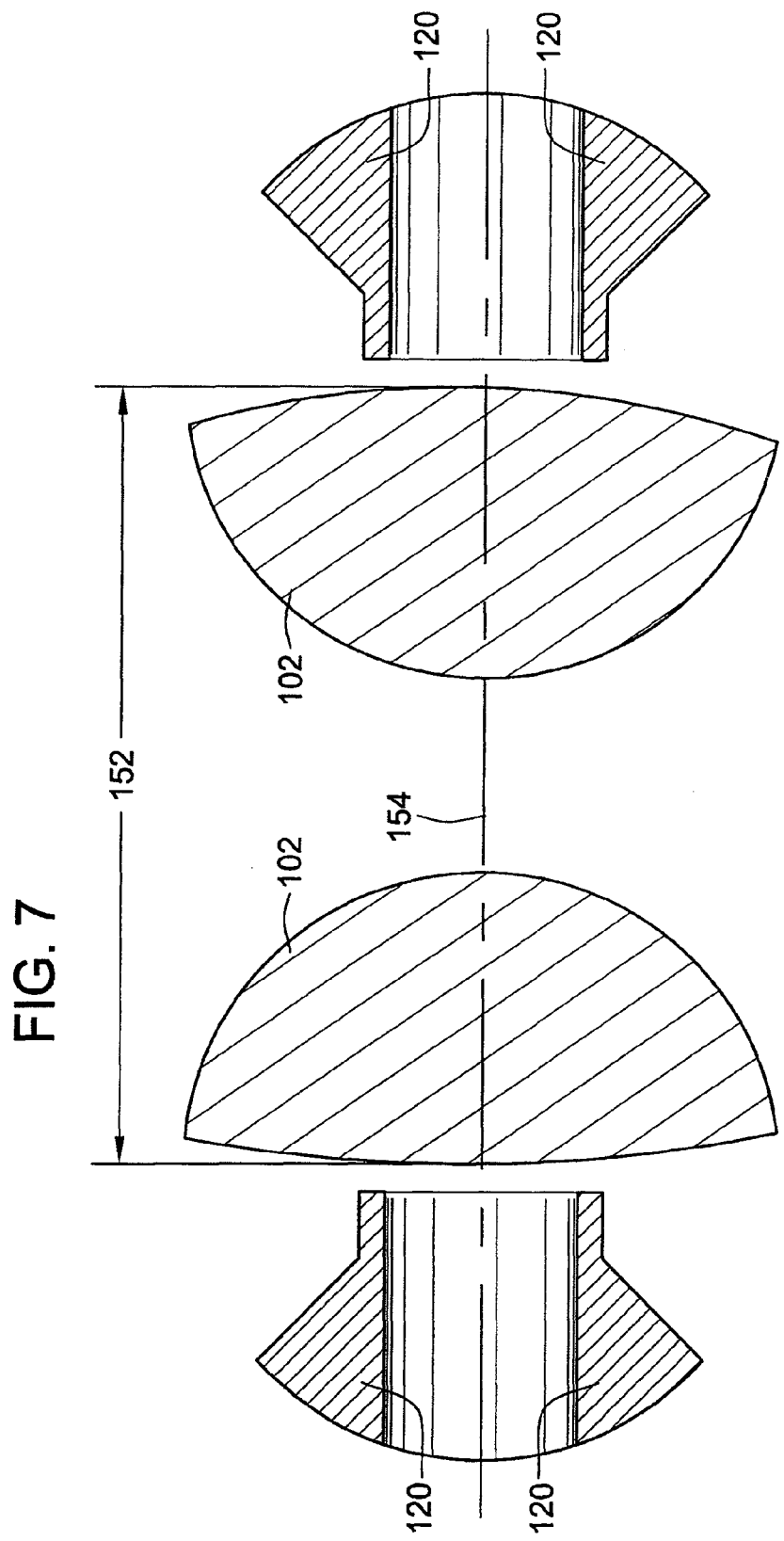
FIG. 7 is an illustration showing the cross-cam distance of the cam in accordance with the teachings of the present invention.
Figure 8:
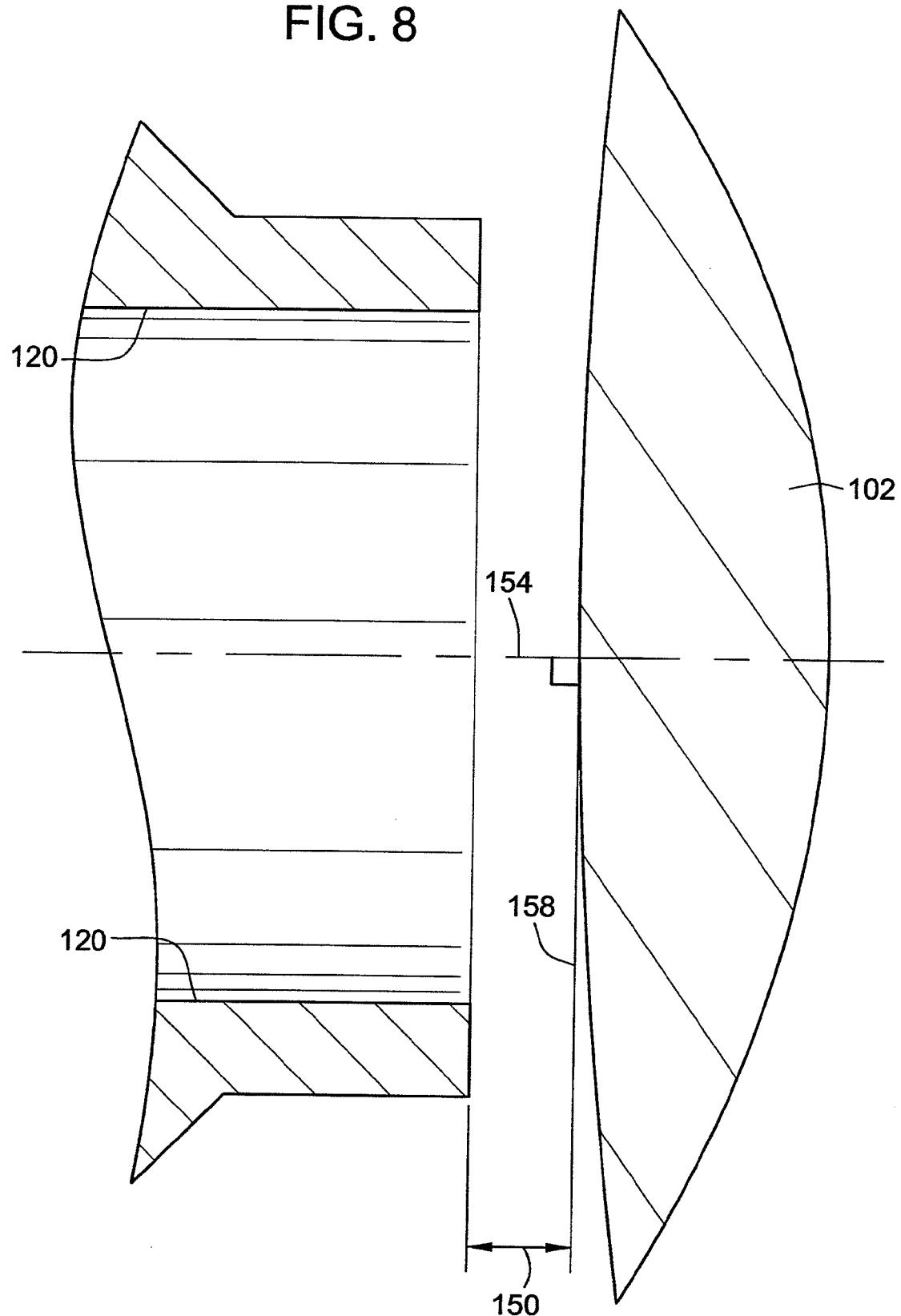
FIG. 8 is an illustration showing the tangent to the cam surface in relation to the nozzle-nozzle centerline.

As the stepper motor 100 rotates the cam 102 (See FIG. 3), the piston 122 begins to move to the right and the Pb port 132 closes. The first stage flow has nowhere to go so P2 increases above Pb until metered flow is forced to exit the fuel metering valve (to Wf) to the engine. As the piston 122 continues to move right as the cam 102 is rotated, the main port 136 cracks open, thus adding to metered flow. As the cam 102 is rotated to the maximum flow position, the piston 122 moves to a position where flow through the main port 136 is at a maximum flow due to the port 136 being at its widest opening.

Now that the overall operation of a two nozzle embodiment of the invention has been described, further details of this embodiment of the invention shall now be described. Flapper-nozzle gap contamination is a critical issue for an EHSV based system since contamination will lead to total loss of FMV position control, resulting in divergence to an extreme (i.e., shutoff or maximum flow). As previously indicated, "flow out" nozzles are typically used in servo valve applications since it is believed that "flow out" nozzles are less susceptible to contamination. However, the "flow out" configuration is difficult to implement in the cam-nozzle system of the present invention, so a "flow in" configuration is used. As explained below, the adverse contamination sensitivity issues are offset by the stepper motor system's force and torque gain capabilities, thus making "flow in" acceptable.

The stepper motor system is a relatively low energy motor coupled to relatively high energy hydraulics. The stepper motor in combination with a gearbox provides the capability to decrease stepper motor speed and increase its torque while staying at the same energy level. This is accomplished by proper selection of the motor stator and rotor tooth count and the gearbox ratio. This can be used to more closely match the motor torque/force capability with that of the hydraulics while still keeping the motor fast enough to handle dynamic operation. The stepper motor has nearly perfect gain and is essentially unaffected by torque disturbances due to higher torque capability, the gear box torque amplification and the inherent detent feature of the stepper motor. The round, symmetrical, balanced construction of the stepper motor is in essence unaffected by vibration and temperature variations. The end result is a motor with decreased speed and sufficient torque to overcome the hydraulic system if necessary. The hydraulic system still provides the high power requirements (combination of high speed and high forces) but the maximum hydraulic force can not overcome the stepper motor. As a result, hydraulic failure is no longer a critical failure, so the use of reverse flow nozzles is not a major concern. The swapping of stepper motor speed for higher motor torque and then balancing this torque with hydraulic capability has a positive effect on failure modes, thereby allowing flexibility in the first stage hydraulic circuit.

The precision machined placement of stator and rotor teeth provide the inherent baseline position and gain accuracy of the stepper motor, thereby eliminating the need for a position sensor. This accuracy does not change with life, is essentially constant from unit to unit, and is not a function of any calibration procedure. The round, symmetric construction of the stepper motor maintains this accuracy in the presence of environment variations (e.g., temperature). Torque disturbances at the output shaft such as dynamic seal friction, nozzle hydraulic loads, unbalanced cam mass, etc. are minimal and are essentially rejected by the precision gearbox 140 (comprising pinion gear 110, ring gear 106, planet gears 114 and planet frame 116) and the high detent torque of the motor. In one embodiment, a 10:1 gearbox ratio is used. It is noted that other gearbox ratios may be used. The detent torque prevents disturbances from having any appreciable effect until they reach such a magnitude that they completely overpower the stepper motor. The stepper motor rotor rides on precision ball bearings 138 and is inherently precision-balanced about its rotation axis in the presence of translational accelerations (i.e., vibration), so the torque disturbances at the motor rotor are negligible. The stepper motor 100 has no channel-channel tracking error due to the fact that both channels share the same rotor-stator-pole flux circuit. Power transients have no effect on steady state operation and the precision gearbox has minimal backlash. In one embodiment, the backlash of the gearbox 140 is approximately two step increments of the stepper motor 100.

Stepper motors are conventionally used in unipolar or bipolar modes of operation. When operated in the unipolar mode of operation, motor winding current is always driven in the same direction. Stepping of the stepper motor 100 in the unipolar mode of operation is accomplished by sequencing the coil energization. This mode of operation utilizes all motor windings, but only energizes half of them at any given time. The bipolar mode of operation, on the other hand, switches the current direction in the motor windings. As a result, all motor windings are powered all of the time. Stepping of the stepping motor 100 in the bipolar mode of operation is accomplished by sequencing the current direction. Since the bipolar mode energizes twice the number of the motor coils than the unipolar mode, the bipolar mode of operation can obtain about twice the torque as the unipolar mode from the same sized motor. To obtain dual channel operation, the motor is wound in the "universal 8-wire" configuration. Only one half of the windings are used for each channel, but these windings are operated in bipolar mode. This allows the creation of a dual channel, bipolar stepper motor with the same performance as a single channel stepper unipolar motor and results in an affordable, low weight, highly reliable, high performance dual channel motor.

The stepper motor 100 is coupled to the FMV via the cam rotation and nozzle-gap-orifice (first stage hydraulics) in the forward path and direct mechanical translation in the feedback path. The cam 102 is precision machined and assures stroke/degree gain accuracy. The hydraulic system assures the piston 122 tracks the cam 102 essentially perfectly except for the effects of piston stiction (i.e., static friction) forces.

A control loop block diagram with FMV stiction disturbance as the input and FMV position as the output has the gap-to-piston gain (dZgap/dZpiston) and the hydraulic pressure gain (dPz/dZgap) in the feedback path. These items need to be maximized for good disturbance rejection. In the invention, the fluid gap is minimized to the limitations of contamination concerns, thereby maximizing the dPz/dZgap gain. The direct feedback assures a relatively large dZgap/dZpiston gain of 1. This results in a superior stuck spool force gain and accurate cam-piston tracking. The direct mechanical feedback of piston position to first stage hydraulic fluid gap maximizes the "force per unit of piston position error" thereby maximizing FMV stiction disturbance rejection. The direct feedback also maximizes cam-nozzle crush forces with minimal piston position error. The stepper motor has much larger torque capability (without excessive weight or power increases) allowing the total FMV force margin to be equal to the sum of motor mechanical forces and first stage hydraulic forces. These forces can be ratioed such that a first stage hydraulic failure (plugged orifice) will not cause a divergence of the FMV. If the maximum hydraulic force is insufficient to move the piston 122, the cam 102 hits the nozzle 120 and a mechanical force is discretely applied that adds to the hydraulic force. The total maximum force margin is obtained with minimal piston position error.

Turning now to FIGS. 5-8, the first stage hydraulics (cam-nozzle gap and orifice) has Psf–P2 across it at all times as previously indicated. This pressure is maintained at a relative constant value via a bypass valve. The first stage flow remains constant as long as the cam-nozzle gap 150 remains constant. The cam has been designed so that the cross-cam distance 152 on the nozzle-nozzle centerline 154 is a constant for any cam angle 156 thus maintaining constant total gap. The cam 102 has also been designed so that the tangent 158 (see FIG. 8) to the cam surface is always perpendicular to the nozzle-nozzle centerline 154, thereby allowing the cam 102 to contact and push on the nozzles 120 if required.

As can be seen from the foregoing, a robust stepper motor driven proportional fuel metering valve has been described. Robustness, as used herein, refers to the ability of a system to remain accurate in the presence of disturbance inputs and environment variations. Disturbances lead to a shift in the entire step versus position plot and gain variations lead to changes in the slope of the plot. Disturbances are due to undesired torques and forces as well as imperfect calibration. Gain variations are due to the change in output/input characteristics due to component life and environment. Robustness is obtained in embodiments of the invention by minimizing the magnitude of disturbances where possible by isolating the device, maximizing the disturbance rejection characteristics of the device, designing a device with minimal wear and/or whose performance is unaffected by wear, precision calibration, and inherent gain accuracy in the presence of environment variations (e.g., temperature, stray flux, vibration, pressures, etc.).

While a stepper motor driven proportional fuel metering valve has been described, the principles of the invention may be applied to other types of servo-valves. For example, the cam-nozzle configuration can be used in other servo-valve applications such as a push-pull valve for a servo piston, a single nozzle servo-valve, etc. Similarly, the stepper motor drive can be used in the above configurations. Further, as will be discussed more fully below, in addition to the two-nozzle embodiment discussed above, a single nozzle may be used as well.

Figure 9:
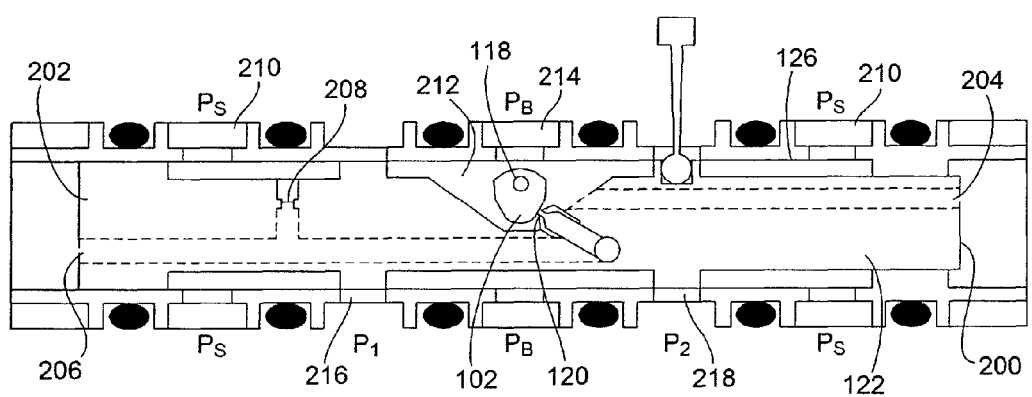
FIG. 9 is a schematic illustration of a single nozzle embodiment of the fuel metering valve system constructed in accordance with the teachings of the present invention.

An advantage of going to a single nozzle embodiment, such as that depicted in FIG. 9, is that it reduces cost, albeit at the expense of reduced force gain and for margin of the two nozzle embodiment discuss above. It should be noted that while the embodiment of FIG. 9 illustrates the Ps supply flowing into a single orifice 208 at end, 202 of piston 122, flowing through nozzle 120 and into the cam area 212, then exiting the center tap 214 (Pb), such a configuration is hydraulically equivalent to the reversed hydraulic flow illustrated and discussed above for the two nozzle embodiment shown, e.g., in FIG. 3. Indeed, in a two nozzle embodiment that subscribes to the hydraulic flow scheme shown in FIG. 9, the nozzles would simply be crossed so that fluid pressure for the right end 200 would be directed to the left side of the cam 102 and that fluid pressure for the left end 202 would be directed to the right side of the cam 102.

With regard to the single nozzle embodiment of FIG. 9, the hydraulic supply port 210 supplies pressure Ps through orifice 208 to port 206 on the left end 202 of piston 122, and to the single nozzle 120 located on the opposite side of the cam 102. Within the cam area 212, which is coupled to the center tap 214, the hydraulic pressure Pb, lower than supply pressure, is communicated through port 204 to a portion of the cross-section area of piston 122 at the right end 200 of the piston 122. Supply pressure 210 (Ps) is connected to the remaining portion of the cross-section area of piston 122. As with the previously discussed two nozzle embodiment, a force balance between the two ends 200, 202 is established that maintains the piston 122 at a given position. As the cam 102 is rotated, the cam-nozzle gap increases or decreases, depending on the direction of rotation of the cam 102, which creates a force imbalance between the two ends 200, 202. This force imbalance will result in the piston 122 moving one way or the other to again establish the force balance between the two ends 200, 202. Such movement will then provide the flow control to ports 216, 218 in the embodiment shown. As will be recognized by those skilled in the art, a translation of the piston 122 to the left from the position shown in FIG. 9 will couple port 214 with port 216 and port 210 with port 218. A translation of the piston 122 to the right from the position shown in FIG. 9 will couple port 214 with port 218 and port 210 with port 216.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A servo-valve having a housing and adapted to operate without a position sensor comprising:
    a cam connected to an output shaft of a stepper motor, the stepper motor controlling the position of the cam; and
    a spool piston within the housing and having at least one nozzle in fluid communication with the cam, the at least one nozzle having a flow path, the spool piston moving as a result of a pressure imbalance at the ends of the spool piston occurring in response to a change in a gap between the cam and the at least one nozzle due to a change in the position of the cam.

2. The servo-valve of claim 1 wherein the change in position of the cam increases a gap between the cam and one of the plurality of nozzles when rotated in a first direction and reduces the gap when rotated in a second direction.

3. The servo-valve of claim 1 wherein the at least one nozzle of the spool piston includes a single nozzle having a first flow path leading to a first end of the piston, the piston including a second flow path leading from a second end of the piston to a cam area formed within the piston.

4. The servo-valve of claim 3, wherein the first flow path is coupled to a supply port and the cam area is coupled to a drain port, and wherein the single nozzle is positioned on a side of the cam opposite the first end.

5. The servo-valve of claim 1 wherein a tangent to a surface of the cam at the centerline of the at least one nozzle is approximately perpendicular to the centerline of the at least one nozzle.

6. The servo-valve of claim 1 further comprising a gearbox connected between a rotor of the stepper motor and the output shaft.

7. The servo-valve of claim 6 wherein the stepper motor has a housing and a rotor and the gearbox comprises:
    a planet frame attached to the output shaft and a plurality of planet gears;
    a ring gear integral to the stepper motor housing and operatively connected to the plurality of planet gears; and
    a pinion gear connected to the rotor and operatively connected to the plurality of planet gears.

8. The servo-valve of claim 1 wherein the servo-valve is a fuel metering valve.

9. The servo-valve of claim 1 wherein the flow path through the at least one nozzle is out of the nozzle.

10. A servo-valve, comprising:
    a housing having a plurality of ports including a source port, a drain port, and at least one metered port;
    a cam positioned for rotation with the housing;
    a piston positioned within the housing for linear translation therein, the piston having formed therein a cam area in which the cam is accommodated, the cam area being in fluid communication with one of the source port or the drain port, the piston further including a nozzle extending into the cam area in proximity to the cam such that a gap is formed between the nozzle and a surface of the cam, the nozzle being in fluid communication with a first end of the piston and being in fluid communication with one of the drain port or source port that is opposite the other of the drain port or source port which is in fluid communication with the cam area, the cam area being in fluid communication with a second end of the piston; and
    wherein rotation of the cam such that the gap is one of increased or decreased creates a pressure imbalance between the first end and the second end such that the piston is linearly translated within the housing to equalize the pressure imbalance.

11. The servo-valve of claim 10, wherein the piston further includes a source flow passage in fluid communication with the source port of the housing and a drain fluid passage in fluid communication with the drain port of the housing, the piston configured such that linear translation of the piston from a null position within the housing results in fluid communication between the metered port and one of the source fluid passage or the drain fluid passage.

12. The servo-valve of claim 11, wherein the piston further includes a second metered port, the piston configured such that linear translation of the piston from a null position within the housing results in fluid communication between the second metered port and one of the source fluid passage or the drain fluid passage.

13. The servo-valve of claim 12, wherein the piston is configured such that when the metered port is in fluid communication with the source fluid passage the second metered port is in fluid communication with the drain fluid passage.

14. The servo-valve of claim 10, wherein the nozzle is positioned on a side of the cam opposite the first end.

15. The servo-valve of claim 10, wherein the piston configured such that linear translation of the piston from a null position within the housing results in a variation in flow through the metered port.

16. A fuel metering valve having a valve body comprising:
   a stepper motor;
   a cam operatively connected to the stepper motor, the cam rotating position in response to stepping of the stepper motor;
   a spool piston within the valve body and having a nozzle in fluid communication with the cam and movable between a shutoff position and a maximum flow position, the nozzle having a first flow path leading from a first end of the spool piston, a second flow path in fluid communication with the cam and a second end of the spool piston, the spool piston moving in response to a change in position of the cam that changes a gap between the cam and the nozzle thereby creating a pressure imbalance between the first end and the second end.

17. The fuel metering valve of claim 16 wherein a tangent to a surface of the cam at the nozzle centerline of the nozzle is approximately perpendicular to the nozzle centerline of the nozzle.

18. The fuel metering valve of claim 16 further comprising a gearbox connected between a rotor of the stepper motor and the output shaft.

19. The fuel metering valve of claim 18 wherein the stepper motor has a housing and a rotor and the gearbox comprises:
   a planet frame attached to the output shaft and a plurality of planet gears;
   a ring gear integral to the stepper motor housing and operatively connected to the plurality of planet gears; and
   a pinion gear connected to the rotor and operatively connected to the plurality of planet gears.

20. The fuel metering valve of claim 16 wherein the flow path through the nozzle is out of the nozzle.

* * * * *